Jan. 4, 1966 E. HOPNER 3,228,016

METHOD AND APPARATUS FOR HIGH DENSITY DIGITAL DATA MAGNETIC RECORDING

Filed Sept. 11, 1961 3 Sheets-Sheet 1

INVENTOR.
EMIL HOPNER
BY
FRASER AND BOGUCKI
ATTORNEYS

MAGNETIC TRANSFER CHARACTERISTIC-PRESATURATE MEDIUM-DC BIAS

MAGNETIC TRANSFER CHARACTERISTIC-AC BIAS

INVENTOR.
EMIL HOPNER
BY
FRASER AND BOGUCKI
ATTORNEYS

INVENTOR.
EMIL HOPNER
BY FRASER AND BOGUCKI

United States Patent Office 3,228,016

Patented Jan. 4, 1966

3,228,016

METHOD AND APPARATUS FOR HIGH DENSITY DIGITAL DATA MAGNETIC RECORDING

Emil Hopner, Yorktown Heights, N.Y., assignor to International Business Machines Corporation, New York, N.Y., a corporation of New York

Filed Sept. 11, 1961, Ser. No. 137,342
9 Claims. (Cl. 340—174.1)

This invention relates to hig density magnetic recording systems and more particularly to a new and improved method and apparatus for recording binary coded digital information on a magnetizable medium.

In the storage of digital data it is well known to apply electrical signals to a magnetic recording head representing binary coded numerical data. A magnetizable medium which is transported past the magnetic recording head is subjected to magnetic fields which cause the magnetizable medium to be brought to either a saturation level of magneization in one direction, or a saturation level of magnetization in the opposite direction.

In one system of recording of electrical signals representing binary information, magnetization in one given direction represents a first binary value, while magnetization of the recording medium in the opposite direction represents the other binary value. In other well-known types of recording systems for binary signals, a transition between one direction of saturation magnetization and the other direction of saturation magnetization represents one binary value, while the lack of any such transition corresponds to the opposite binary value. In any event, in conventional arrangements for the recording of binary coded signals, the magnetizable medium is driven to a state of saturation magnetization in one or the other of two mutually opposed directions. The recorded information on the magnetizable medium is recovered in known arrangements by passing the medium adjacent a magnetic reading head within which a voltage is generated corresponding to changes in magnetization of the medium. As a result, in saturation recording systems, a pulse is generated by the magnetic reading head coincident with each transition appearing on the magnetic medium between the oppositely directed saturation magnetization levels.

In an effort to minimize the space required for the storage of a large quantity of digital data, a great deal of effort has been expended to increase the number of binary coded digits, i.e. bits, which may be recorded within a given unit length of the recording medium. For comparison purposes, a figure of merit representing the amount of compression of the data achieved is sometimes referred to as the packing density which is generally given in terms of the number of bits per inch of the magnetizable medium.

Although the packing density in conventional recording systems has been gradually increased so that it is now possible to record and read back of the order of 3000 bits per lineal inch of the recording medium, a practical limitation has been encountered due to the tendency for the individually recorded bits of information to spread along the length of the record medium with saturation techniques of recording. The result of the spreading of the individual bits is an overlapping of the adjacent recorded bits of information which, once an upper limit of packing density is exceeded, leads to a large number of errors in the readout of the recorded information.

In an effort to overcome the limits imposed by the spreading tendency in high density binary recording, magnetic media are sometimes employed which are relatively thin so that the magnetic fields corresponding to each recorded bit on the magnetic medium are more or less confined. However, with relatively thin magnetic mediums, particularly in tape recording, the problems associated with the handling and transport of the magnetic medium without breakage or damage have been multiplied.

An alternative approach to the problem of high density recording of digital data contemplates a reduction in amplitude of the recording current applied to the magnetic recording head to produce magnetization of the magnetic medium at levels less than saturation, thereby to reduce the tendency for the information to spread between adjacent bits. The problem here, however, has been that with known systems for the recording of digital data, a reduction in the signal amplitude has led to a deterioration of the effective signal-to-noise ratio of the electrical signals derived during readout and the inherent noise of the magnetic medium and the recording and reading systems.

While the use of alternating current bias, direct current bias, or a combination applied to a magnetic recording head is well known in analog recording systems, as for example, in tape recorders designed for the storage of audio frequency signals, it has been previously thought that such techniques were not applicable to digital data recording systems. In the field of analog signal recording the proper application of an alternating current or direct current bias to the recording head produces effective linearity over a useful range of magnetization. In contrast, known digital data recording systems are predicated upon driving the magnetization medium between saturation levels without reference to any non-linearity which might occur during the transitions between saturation levels.

In accordance with the present invention it has been discovered that known analog recording techniques may be applied to digital recording systems in a manner which leads to a surprising result. As noted above, the packing density of previous digital data recording systems is confined within certain practically achievable limits which in the present state of the art are of the order of 3000 bits per inch. The method and apparatus of the present invention provide high density recording of digital data signals through the use of certain analog recording techniques in a digital data recording system, with the result that an unexpectedly high packing density may be achieved with high reliability in the readout of the stored information and with a relatively high signal-to-noise ratio. Systems which have been operated in accordance with the invention have been found to be capable of a packing density as great as 10,000 bits per lineal inch. These achieved results, however, do not represent the limiting capability of the techniques in accordance with the present invention in providing a high packing density inasmuch as modifications in the arrangements and techniques of the invention are capable of achieving very much higher packing densities, as for example, 50,000 bits per inch, limited only by the physical structure and dimensions of the recording systems employed. Accordingly, through the use of the method and apparatus of the present invention, the amount of digital data which may be recorded on a given record medium is increased many-fold with the result that less physical storage space is required, and the access time required to locate and derive any particular information is substantially reduced.

Accordingly, it is principal object of the present invention to provide a new and improved method and apparatus for the high density recording of digital data signals.

It is another object of the present invention to provide a new and improved recording system in which analog recording techniques are employed in a binary digital recording system.

It is yet another object of the present invention to provide a new and improved binary signal recording system capable of a packing density of the recorded information several times greater than that previously known.

It is still another object of the present invention to provide a method and apparatus for the recording and derivation of digital data signals with an increased degree of reliability.

It its a further object of the present invention to provide a new and improved binary digital signal recording system in which high densities of recording are achieved with a relatively thick magnetizable record medium.

In accordance with the invention, there is provided a high density magnetic recording system for digital data signals utilizing analog recording techniques. In one particular arrangement of the invention, binary coded digital data signals are applied to a magnetic recording head along with bias signals of alternating or direct current or a combination thereof. A magnetizable recording medium having a saturable magnetization characteristic is transported relative to the magnetic recording head. The amplitudes of the binary coded signals and the bias signals applied to the magnetic recording head are selected to produce a net magnetization which is substantially linearly proportional to the amplitude of the data signal. The rate of appearance of the binary coded signals and the velocity of transport of the record medium is such that a high packing density of the recorded information is achieved.

In one system described below, a phase modulated alternating signal is generated in accordance with the value of binary coded information to be stored. Each full cycle of an alternating current carrier wave represents one bit of information, with one phase of the modulated carrier wave representing one binary value, while an opposite phase of the carrier represents another binary value. The phase modulated alternating current carrier is applied to a magnetic recording head along with suitable bias currents to produce linearly proportional magnetization of a recording medium. The recorded signal information is derived by passing the recording medium adjacent to a reading head within which there is generated an electrical signal corresponding to the recorded modulated carrier, and the binary coded information is recovered from the signal generated by the reading head through a process of synchronous demodulation.

In accordance with another system described below, a nonreturn-to-zero mode of coding of the binary information may be employed, in which a transition from one value to another represents one binary value, while the absence of such transition corresponds to the other binary value. In this arrangement, a transition modulated wave is applied, with suitable bias currents, to the recording head to produce substantially linear recording as in the above system. The binary information is recorded by reversing the polarity of the information carrying parameter for one binary value and not reversing the polarity for the other binary value. In effect, using transition modulation a single half cycle of the highest frequency of the available band is thus employed to record a binary digit. The recorded information is recorded by passing the recording medium adjacent to a magnetic reading head to produce an alternating current signal corresponding to the recorded transition modulated wave which may be processed to derive the recorded binary information.

In accordance with a further aspect of the invention, theer is provided a new and improved method and apparatus for the recording of digital data signals within which a linear magnetic recording system operates to receive and reproduce electrical signals which are substantial replicas of one another. A magnetic recording system in accordance with this aspect of the invention contemplates a high packing density of recorded information through the provision of both ampltiude and phase equalization within the recording system to alleviate the problems of interaction between adjacent recorded bits of information.

A better understanding of the invention may be had from a reading of the following detailed description and an inspection of the drawings, in which.

Figure 1:
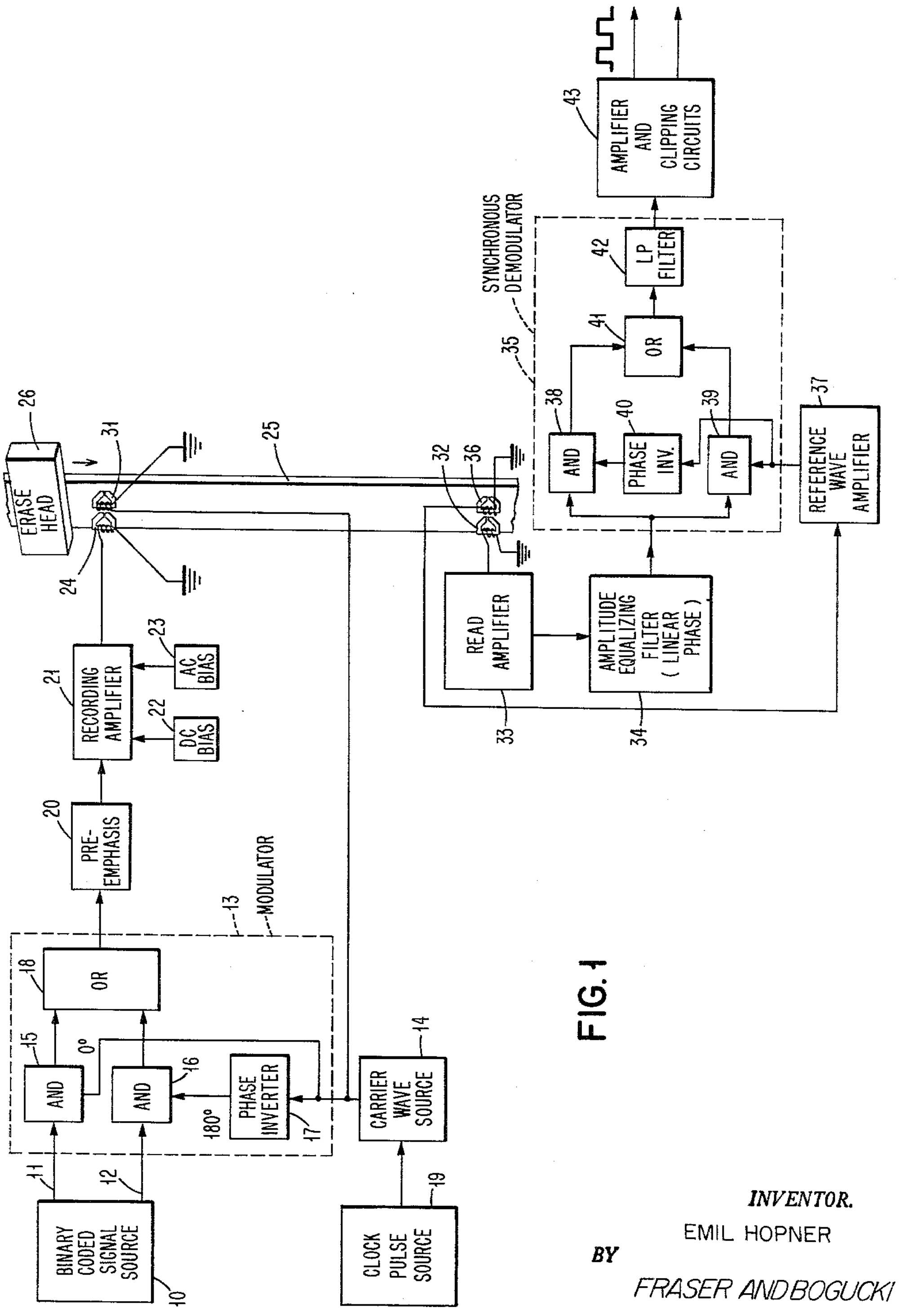
FIG. 1 is a diagrammatic illustration of one system for the high density magnetic recording of binary coded information in accordance with the invention.
Figure 4A:
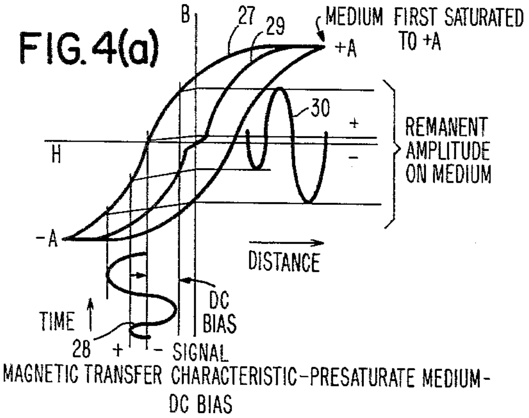
Figure 4B:
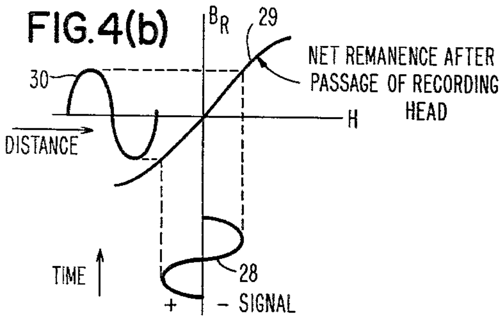
Figure 5:
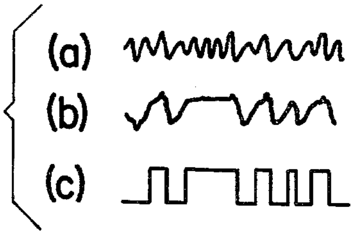
Figure 7:
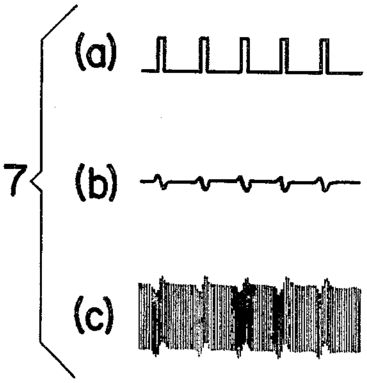
Figure 8:
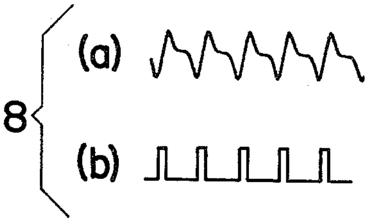
Figure 6:
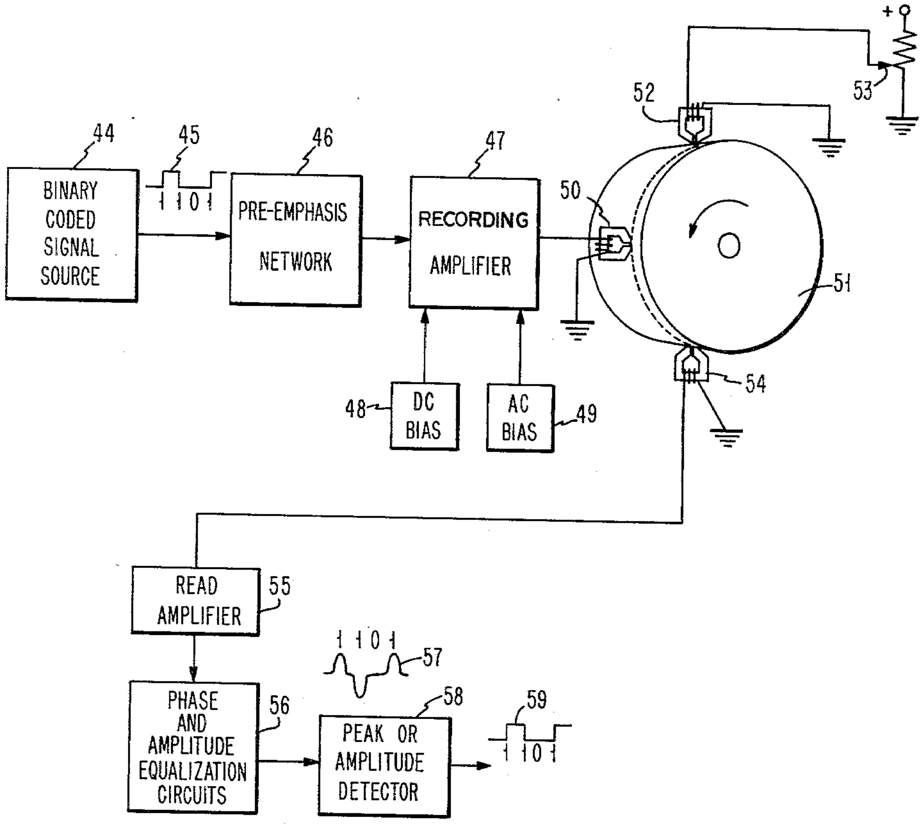

FIGS. 4(*a*) and 4(*b*) are graphical illustrations of the net linear magnetic remanence and transfer characteristic achieved through the use of bias current techniques;

FIG. 5 is a set of graphical representations of various electrical signals which may be derived and reproduced from magnetically recorded binary information in the system of FIG. 1;

FIG. 6 is a diagrammatic illustration of an alternative arrangement in accordance with the invention for high density magnetic recording of binary coded signals;

FIG. 7 is a set of graphical illustrations of various waveforms appearing in the system of FIG. 6 during recording; and FIG. 8 is a set of graphical illustrations of various waveforms appearing in the system of FIG. 6 during the reading of the stored information.

In a accordance with the method and apparatus of the present invention, binary coded signal information may be recorded on a magnetic medium such as a magnetizable tape, drum or disc with packing densities being achieved which are significantly greater than those available in prior systems. One illustrative system for practicing the present invention is shown in FIG. 1 in which binary coded electrical signals from a binary coded signal source 10 are applied to the input of the recording system. The binary signals from the source 10 may be arranged to appear on two separate leads 11 and 12 in accordance with the value of each successively appearing binary coded digit. In one system of coding, a relatively high voltage on the lead 11 and relatively low voltage on the lead 12 may represent a binary 1 while a relatively low voltage on the lead 11 and a relatively high voltage on the lead 12 may represent a binary 0. An example of this system of coding is shown in the graphical illustrations of FIG. 2 wherein FIG. 2(*a*) illustrates a signal which might appear on the lead 11 of the system of FIG. 1 while the illustration of FIG. 2(*b*) corresponds to the signal appearing on lead 12 of FIG. 1.

In an alternative system of coding, transitions between the voltage levels on the leads 11 and 12 may represent one binary value while the lack of any such transition represents the opposite binary value. This system of coding is illustrated in FIG. 3 in which the graphical illustration of FIG. 3(*a*) corresponds to the signal appearing on the lead 11 of FIG. 1 and the graphical illustration in FIG. 3(*b*) corresponds to the signal appearing on the lead 12 of FIG. 1.

Figure 2:
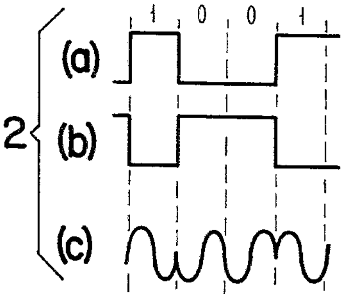
FIG. 2 is a set of graphical illustrations representing one coding technique for the binary information recorded in the arrangement of FIG. 1.

In the arrangement of FIG. 1 the binary signals on the leads 11 and 12 are applied to a modulator 13 which is driven from a carrier wave source 14. The carrier wave source 14 provides a reference wave of constant amplitude and the modulator 13 functions to provide at its output an alternating current signal of reversible phase corresponding to the binary coded signals from the binary coded signal source 10.

Where the coding system of FIG. 2 is employed, each cycle of the alternating current signal from the modulator 13 corresponds to one binary bit, with a cycle of one given phase corresponding to a binary 0 while a cycle of the opposite phase corresponds to a binary 1. In the graphical illustration of FIG. 2(*c*) there is shown an example of an alternating current signal which may be provided by the modulator 13 wherein a phase reversal takes place each time the value of the succeeding binary bit differs from the previous value. As may be seen from FIG. 2(*c*) each individual cycle of the alternating current signal corresponds to one binary bit with the phase of the signal in any given cycle corresponding to the binary value of the bit, e.g., zero or one.

Figure 3:
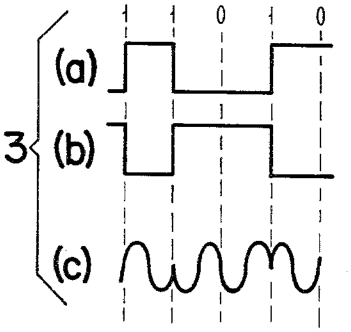
FIG. 3 is another set of graphical illustrations representing an alternative coding technique for the recording of binary information in the arrangement of FIG. 1.

In the alternative coding system illustrated in FIG. 3, reversals in phase of the alternating current signal from the modulator 13 correspond to one binary value while the lack of a reversal corresponds to the opposite binary value. Thus, as illustrated in FIG. 3(*c*), binary 1's are represented by phase reversals while binary 0's correspond to the lack of a phase reversal.

Although any suitable modulator circuit may be employed for producing an alternating current wave of reversible phase, there is illustrated within the dashed rectangle 13 of FIG. 1 one simple arrangement for performing the requisite function. In the modulator 13 of FIG. 1, there may be included two separate AND gates 15 and 16 which receive the binary coded signals from the source 10 via the leads 11 and 12. The reference wave from the carrier wave source 14 is applied to the AND gates 15 and 16 with a phase inverter 17 being included in one of the connections so that the AND gates 15 and 16 receive reference waves of opposite phase with respect to one another. The signals on the leads 11 and 12 alternately open the AND gates 15 and 16 so as to pass to an OR circuit 18 an alternating current wave having a phase determined by the binary coded signals appearing on the leads 11 and 12. The waves passed by the AND gates 15 and 16 are combined in the OR circuit 18 and appear at the output of the modulator 13.

In order to ensure that a complete single cycle corresponds to each binary bit of information in the arrangement of FIG. 2, or to ensure that a phase reversal occurs coincident with the appearance of binary 1's in the coding system of FIG. 3, the carrier wave source 14 should preferably be synchronized with the appearance of the binary coded signals from the source 10. Accordingly, in the arrangement of FIG. 1 there is included a clock pulse source 19 which is synchronized by any suitable means with the binary coded signal source 10. Both the binary coded signal source 10 and the clock pulse source 19 are conventionally provided in digital data processing systems in which the operation of at least a part of the system is in synchronism with a train of clock pulses. By applying clock pulses from the source 19 to a suitable frequency control circuit in the carrier wave source 14 the carrier wave source may be brought into synchronism with the appearance of the binary coded digits from the binary coded signal source 10 so that as the AND gates 15 and 16 of the modulator 13 open and close, single cycles of the reference wave are passed to the OR circuit 18 in coincidence with the sequence of binary coded bits. This action is illustrated in FIGS. 2(*c*) and 3(*c*).

The alternating current signal from the OR circuit 18 may be applied to a recording preemphasis circuit 20, such as is conventionally used in high quality audio frequency magnetic tape recording. The preemphasis circuit has an appropriate rising gain characteristic with frequency so that the higher frequency components of the signal are emphasized. A recording amplifier 21 is driven from the preemphasis circuit 20 with the recording amplifier having a selected overall gain which may be adjustable or fixed as desired to establish a proper recording level. In order to produce substantially linear recording in the manner conventionally used in analog magnetic recording, appropriate direct current (D.C.) or alternating current (A.C.) bias is superimposed on the recording signal. Accordingly, a D.C. bias source 22 or an A.C. bias source 23 are used as additional inputs to the recording amplifier, singly or in combination. The signal from the recording amplifier 21 is applied to a recording head 24 which should preferably have a narrow gap between its pole pieces, as for example of the order of 100 microinches.

A magnetic recording medium of a suitable type is transported past the recording head 24 by a conventional transport mechanism not shown. In the arrangement of FIG. 1 the magnetic recording medium comprises a conventional tape 25 bearing a magnetizable coating. By means of a conventional erase head 26 the tape may be brought into a condition of uniform magnetization appropriate to the recording bias method chosen thereby erasing any previously recorded information. The recording head 24 thus functions to substantially linearly magnetize the magnetizable surface of the tape 25 in accordance with the binary coded digital signals supplied by the source 10. The recording medium may be left with a bias component in the remanent magnetization, but this is rejected from the readback signal by appropriate filtering upon playback. The result is that information may be recorded on the tape 25 with extremely high packing densities, a single bit occupying approximately the gap length of the recording head. By utilizing a nonsaturation level of recording, the binary coded digital information may be recorded with substantially less interference between adjacent recorded bits than is normally encountered in high density recording systems operating on a saturation principle. Yet by utilizing suitable bias current techniques a reasonably steep linear transfer characteristic between recorded signal and readback signal may be achieved as shown diagrammatically in FIG. 4. The resulting effective gain enables the system to operate with significantly improved signal-to-noise ratios.

FIG. 4(*a*) is a diagrammatic illustration in which the loop 27 corresponds to the magnetization characteristic of the surface layer of a magnetic recording medium such as the tape 25 of FIG. 1. The waveform 28 represents the signal applied to the recording head 24 while the curve 29 corresponds to the resultant transfer characteristic between the signal and the resultant magnetization 30 of the tape 25. FIG. 4(*a*) shows the case where direct current bias is used and FIG. 4(*b*) shows the similar case for alternating current bias. In both bases, a steeper slope to the transfer characteristic and a wider linear range is obtained by the use of appropriate bias than would be achieved without bias. The higher signal-to-noise ratio and wider linear range achieved with bias, permits the system to operate over a wide dynamic range; that is, the amplitude of the readback signal can vary over a wide range and still produce satisfactory operation of the system. In saturation recording, it is not possible to recover small signals. It is essential to recover small signals to achieve high packing densities.

In addition to the binary digital signal recorded on the tape 25, a reference wave from the carrier wave source 14 may be applied to a separate track by means of a recording head 31. As will be described below, the reference wave may be employed in a synchronous demodulator arrangement for reliably deriving the recorded binary signal information from the tape 25. Other alternative systems may be employed as well for producing a reference wave by means of which synchronous demodulation may be achieved. For example, in the copending United States patent application Serial No. 743,576, in the name of Harold G. Markey, and entitled Intelligence Communication System, filed June 23, 1958, now Patent No. 3,088,069, a system is shown in which a suitable reference wave may be derived directly from the binary signal information without requiring a separate transmission link or separately recorded track bearing the reference wave itself.

The recorded signal on the tape 25 may be recovered by means of a reading head 32 with the derived alternating current signal being applied to a read amplifier 33. The amplified signal from the read amplifier is applied to an amplitude equalizing filter 34 preferably having a linear phase characteristic which functions to provide at its output an alternating current signal substantially identical to that supplied by the modulator 13 of the recorder. This signal may be applied to a synchronous demodulator 35. A reference wave is applied to the synchronous demodulator 35 which functions to extract the binary coded digital signals from the alternating current signal. Although as noted above, a reference wave for application to the synchronous demodulator 35 may be locally generated in response to the binary coded signal information itself, in the arrangement of FIG. 1 a simplified system is shown in which a playback head 36 derives the reference wave recorded on the tape 25. This wave is applied to reference wave amplifier 37 with the amplified reference wave being applied to the synchronous demodulator 35. Although other synchronous demodulaation devices may be employed for the demodulator 35, as for example, conventional ring demodulators or the like, there is illustrated in FIG. 1 within the dashed rectangle 35 one simple arrangement for performing this function. The demodulator 35 comprises a pair of AND gates 38 and 39 which receive the alternating current signal from the amplitude equalizing filter 34. In addition, the AND gates 38 and 39 receive the reference wave from the reference wave amplifier 37 with a phase inverter 40 being included in one of the connections so that the reference waves applied to the AND circuits 38 and 39 are opposite in phase with respect to one another. By suitably arranging the amplitudes of the signals applied to the AND circuits 38 and 39 a synchronous demodulation process takes place with the AND circuits alternately passing signals which are combined within an OR circuit 41 and passed through a low-pass filter 42 with the resultant output signal after amplification and wave shaping by means of an amplifier and clipping circuits 43 constituting a substantial replica of the binary coded signals from the binary coded signal source 10. By employing a push-pull output amplifier 43 two separate such signals may be provided with one of the signals being of opposite phase with respect to the other.

The synchronous demodulation technique employed in the magnetic recording and playback system of FIG. 1 when used with suitable bias current techniques and a linear phase amplitude equalizing filter is capable of achieving packing densities of the order of up to 50,000 bits per inch, which it will be appreciated is substantially greater than that currently achievable in conventional binary digital signal recording systems using saturation recording techniques.

Examples of the waveforms which may be derived by means of the arrangement of FIG. 1 and the resultant binary coded electrical signals are shown in FIG. 5 in which FIG. 5(*a*) corresponds to a phase modulated signal appearing at the output of the read amplifier 33, FIG. 5(*b*) corresponds to the binary information signal after synchronous detection and low-pass filtering appearing at the output of the synchronous demodulator 35 and FIG. 5(*c*) represents a binary coded electrical signal after amplification and clipping appearing at the output of the amplifier 43. The graphical illustrations of FIG. 5 were actually taken from oscillographic representations of waveforms encountered in one particular embodiment of the invention from which it may be readily determined that clean and accurate binary coded output signals may be achieved in spite of the high packing density of the recorded information. In a particular system corresponding to the arrangement of FIG. 1, a recorder was employed having a steady state response up to 15 kilocycles and a tape transport speed of 7½ inches per second. Each single cycle or dipulse was reproducible at 15 kilocycles with the length of each dipulse on the tape being 500 microinches, and a recording head gap of .001 inch was employed with the read head having a gap of .00025 inch to produce a packing density of 2,000 bits per inch. By employing appropriate bias a wide range linear magnetic recording transfer characteristic was achieved in accordance with the techniques described in connection with FIG. 4 of the drawings.

FIG. 6 of the drawings illustrates an alternative embodiment of the present invention which operates on a principle of linear nonsaturation recording, but does not require the synchronous modulation and demodulation arrangement of FIG. 1. In FIG. 6 a binary coded signal source 44 provides an electrical signal which may be either coded as shown in FIG. 2(*a*) or in FIG. 3(*a*) as desired. In the particular waveform 45 shown in FIG. 6, a coding system corresponding to FIG. 3(*a*) is employed in which transitions from one voltage level to another represent binary 1 values while the absence of such a transition indicates a binary 0 value. The binary coded signal from the binary source 44 is applied to a preemphasis network 46 and the preemphasized signal is applied to a record amplifier 47 having a gain which is selected to produce nonsaturation recording. As in the case of the arrangement of FIG. 1, bias currents may be applied to the record amplifier from the sources 48 or 49. By utilizing a magnetic recording head 50 having a narrow gap the binary signals may be directly recorded on the magnetic surface of a suitable magnetic medium such as for example a rotating drum 51. An erase head 52 receives an appropriate erase current from a suitable source via a potentiometer 53 to erase any previously recorded information on the drum 51.

The recorded information on the drum is recovered by means of a read head 54 which produces an electrical signal for application to a read amplifier 55. High density recording in the system of FIG. 6 is provided through the combination of nonsaturation bias compensated recording techniques operating in conjunction with phase and amplitude equalization. Accordingly, the signal from the read amplifier 55 is applied to the phase and amplitude equalization circuits 56 which produce an output signal as indicated at 57. The phase and amplitude equalization circuits 56 are conventionally employed with video tape recorders and comprise circuitry responsive to different frequencies for reordering the amplitude and phase relationships of the reproduced signal back to its original form. In other words, amplitude and phase equilization circuits are used to counteract the adverse effects on the signal caused by the unequal frequency response of the amplifiers, magnetic heads and other components used in the recording and reproduction of the signal. As shown in 57 a pulse appears coincident with each binary coded 1 corresponding to each transition of the electrical signal from the binary coded signal source 44. The absence of such a pulse indicates a binary 0. By means of a peak or amplitude detector 58 there may be provided an output signal 59 which is a substantial replica of the binary coded electrical signal from the binary coded signal source 44.

The phase and amplitude equilization circuits 56 function in combination with the remainder of the system of FIG. 6 in providing an overall linear system which enables the high packing densities of the present invention to be achieved. An example of the waveforms which appear in the recording portion of the arrangement of FIG. 6 is shown in FIG. 7 of the drawings while an example of the waveforms derived in the reading portion of the system of FIG. 6 is shown in FIG. 8.

In FIG. 7(*a*) a binary coded signal is shown in which the high amplitude pulses correspond to binary 1 values with the overall repetitive pattern corresponding to a series of binary digits as follows: 010101010. The write signal applied to the amplifier 44 is shown in FIG. 7(*b*). The write signal with a superimposed 100 kilocycle bias current as applied to the record head 50 of FIG. 6 is shown in FIG. 7(*c*).

FIG. 8(*a*) shows the waveforms which appear in a typical reading operation with the same series of binary coded digits as follows: 010101010. FIG. 8(*a*) shows the waveform appearing at the output of the phase and amplitude equalization circuits 56. The signal after peak or amplitude detection in the detector 57 is shown in FIG. 8(*b*). Again, as in conjunction with the arrangement of FIG. 1, the improvement achieved in accordance with the present invention in providing a binary coded output signal where high packing densities are achieved on the recording medium is immediately apparent on inspection of the graphical illustrations.

Although the phase and amplitude equalization circuits 56 may take any suitable form, the particular circuits selected for this purpose should have an amplitude characteristic roughly the inverse of that introduced by the preemphasis network 46 and should introduce phase equalization to render the overall recording and reproducing system linear with respect to both amplitude and phase. Since the provision of such circuits is well within the skill of those familiar with the design of electrical filters, and since the details of a particular circuit will vary from one recording system to the next, no detailed description is believed to be necessary. In any event, it will be appreciated that the circuits for achieving equalization may be included in the read amplifier 55 and need not take a separate form as illustrated in FIG. 6.

Although two separate systems have been described above for practicing the applicant's invention in which a high packing density of binary coded information may be achieved on a magnetic recording medium through the use of analog recording techniques which have heretofore been considered to the inapplicable to digital signal recording, it will be appreciated that the invention is not limited thereto. Each of the systems is exemplary only of the manner in which the invention may be used to advantage. Various modifications and alternative arrangements including the use of various ones of the separate aspects of the invention will readily occur to those skilled in the art. Accordingly, any and all alternative arrangements, modifications or variations falling within the scope of the annexed claims should be considered to be a part of the invention.

What is claimed is:

1. A high density magnetic recording system including the combination of a source of binary coded electrical signals, means coupled to the binary signal source for generating an alternating current sine wave signal of reversible phase representing said binary coded electrical signals, a magnetic recording medium having a saturable magnetization characteristic, a recording amplifier connected to said alternating signal generating means, and means coupled to said recording amplifier for magnetizing said magnetic recording medium to a degree less than saturation in accordance with said alternating signals.

2. A high density system for recording binary information on a magnetic recording medium including the combination of a source of binary coded electrical signals, means coupled to said source of binary coded signals for generating an alternating current sine wave in which the phase of each given cycle represents the value of a binary coded digit, and means coupled to said alternating signal generating means for magnetizing said magnetic recording medium to a degree less than saturation in accordance with said alternating signals.

3. A high density magnetic recording system including the combination of a source of binary coded electrical signals, means coupled to the binary coded signal source for generating the alternating current sine wave having a reversible phase in accordance with the value of each successive bit of binary coded information, a magnetic recording medium having a saturable magnetization characteristic, a magnetic recording head associated with the magnetic recording medium for recording signals thereon, means coupled between the alternating current signal source and the magnetic recording head for causing said magnetic recording head to magnetize said recording medium in accordance with said alternating signals with the dgeree of magnetization of the recording medium being less than saturation level, and a source of bias signals coupled to said magnetic recording head.

4. Apparatus in accordance with claim 3 including means for deriving electrical signals corresponding to the degree of magnetization of the magnetic recording medium, and phase detecting means coupled to said signal deriving means for providing output signals corresponding to the binary coded information recorded on said recording medium.

5. A high density magnetic recording system for binary information including the combination of a magnetic recording medium having a saturable magnetization characteristic, means generating an alternating signal representing binary coded signal information, a recording amplifier connected to said alternating signal generating means, a source of alternating current bias signals, a magnetic recording head, means coupling said recording amplifier and said source of alternating current bias signals to said recording head for magnetizing said magnetic recording medium to a degree less than saturation in accordance with said alternating signals representing binary information, means for deriving electrical signals corresponding to the magnetization on said record medium, a phase and amplitude equalizing means coupled to said electrical signal deriving means, and a detector coupled to said phase and amplitude equalizing means for providing an output signal representing said binary coded signal information.

6. A high density system for storing binary information comprising a magnetic recording medium having a saturable megnetization characteristic, a magnetic recording head associated with the magnetic recording medium for recording the signals thereon, a source of bias signals coupled to the magnetic recording head, means generating an alternating current signal representing binary coded signal information, signal amplifying means coupled between the binary signal generating means and the magnetic recording head having a predetermined gain for causing said binary coded alternating signals to be recorded on said magnetic recording medium with a degree of magnetization being produced in said recording medium corresponding to said binary alternating signals which is less than the level of saturation of the magnetic recording medium, a reading head positioned adjacent said recording medium for deriving an electrical signal corresponding to the information recorded thereon, and phase and amplitude equalization means coupled to said recording head for deriving an output signal corresponding to said binary coded signal information.

7. A high density magnetic recording system including the combination of a source of binary coded electrical signals, means coupled to the binary signal source for generating an alternating current sine wave signal of reversible phase representing said binary coded electrical signals, a magnetic recording medium having a saturable magnetization characteristic, a recording amplifier connected to said alternating signal generating means, means coupled to said recording amplifier for magnetizing said magnetic recording medium to a degree less than saturation in accordance with said alternating signals, means for deriving an electrical signal corresponding to the magnetization of said recording medium, and a synchronous demodulator coupled to said electrical signal deriving means for providing an output signal corresponding to the signals for said binary coded source.

8. A high density system for recording binary information including the combination of a source of binary coded electrical signals, at a selected frequency, means coupled to said source of binary coded signals for generating an alternating current sine wave at the selected frequency and in which the phase of each given cycle represents the value of a binary coded digit, means coupled to said alternating signal generating means for magnetizing said magnetic recording medium to a degree less than saturation in accordance with said alternating signals, means deriving an electrical signal corresponding to the magnetization of said recording medium, and a demodulator coupled to said signal deriving means and responsive to the phase of the derived electrical signal for providing an output signal representing the signals from said source of binary coded signals.

9. A high density recording system in accordance with claim 8 including means for synchronizing said demodulator with said alternating current sine wave generating means.

References Cited by the Examiner

UNITED STATES PATENTS

| | | | |
|---|---|---|---|
| 2,628,287 | 2/1953 | Haynes | 179—100.2 |
| 2,887,674 | 5/1959 | Greene | 340—174.1 |
| 2,933,724 | 4/1960 | Ashby | 340—174.1 X |
| 3,012,234 | 12/1961 | Burns | 340—174.1 |

IRVING L. SRAGOW, *Primary Examiner.*

BERNARD KONICK, *Examiner.*